United States Patent Office 3,814,776
Patented June 4, 1974

3,814,776
HYDANTOINS AND POLYHYDANTOINS
CONTAINING OLEFIN GROUPS
Rolf Fischer, Cologne, and Rudolf Merten, Leverkusen, Germany, assignors to Farbenfabriken Bayer Aktiengesellschaft, Leverkusen, Germany
No Drawing. Continuation of abandoned application Ser. No. 9,075, Feb. 5, 1970. This application Mar. 7, 1972, Ser. No. 232,636
Claims priority, application Germany, Feb. 21, 1969, P 19 08 678.3
Int. Cl. C07d 49/32
U.S. Cl. 260—309.5                                 6 Claims

ABSTRACT OF THE DISCLOSURE

Oligohydantoins and polyhydantoins which contain olefinically unsaturated groups are produced by reacting polyglycine esters and isocyanates which contain an olefinically unsaturated group, optionally together with di- or polyisocyanates.

CROSS-REFERENCE TO RELATED APPLICATION

This application is a continuation of application Ser. No. 9,075, filed Feb. 5, 1970 and now abandoned.

Processes for the production of polyhydantoin plastics are described in Belgian Patent Specifications 678,282, 700,041 and 700,040 which correspond respectively to U.S. Pat. 3,397,253 of Mar. 4, 1966, now abandoned Ser. No. 617,863 of Feb. 23, 1967, and U.S. Pat. 3,448,170 of Feb. 23, 1967. All these processes are based on the reaction of polyvalent glycine ester derivatives with polyisocyanates or polyisothiocyanates.

For example, compounds corresponding to the general formula

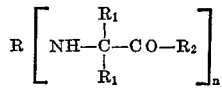

in which R represents a n-valent aliphatic, aromatic or araliphatic radical, $R_1$ represents hydrogen or an alkyl radical and $R_2$ represents a hydroxyl group, an amino group, an alkylamino group, a dialkyl amino group, an alkoxy group or an aroxy group and $n$ is an integer of between 2 and 4, or compounds corresponding to the general formula

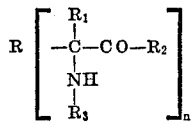

in which R, $R_1$, $R_2$ and $n$ correspond to the radicals defined above whilst $R_3$ represents hydrogen or an alkyl radical, an aralkyl radical or an aryl radical, can be reacted by the aforementioned processes either with a polyisocyanate or with a polyisothiocyanate so as to form the corresponding polyurea which may be cyclised either simultaneously or subsequently.

Also, it is possible by the addition of aromatic and aliphatic polyamines to maleic acid esters and their derivatives, to obtain corresponding α-amino carboxylic acid esters which can be condensed by reaction with polyisocyanates so as to form polyhydantoins in the same way as described in Belgian Patent Specification 711,591, 711,- 592 and 711,593, which correspond, respectively, to now abandoned U.S. application Ser. No. 706,696 of Feb. 19, 1968; U.S. application Ser. No. 706,621 of Feb. 19, 1968 and U.S. application Ser. No. 706,666 of Feb. 19, 1968.

The reaction leading to the polymers can be schematically represented by the following equation:

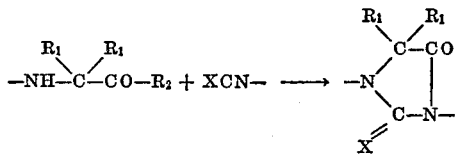

in which $R_1$ and $R_2$ are as defined above, whilst X represents O or S.

In producing these polyhydantoins, it is possible by using stoichiometric quantities of polyglycine ester and polyisocyanate to obtain polyhydantoins of relatively high molecular weight, the disadvantages of which include limited solubility and high viscosity of any solutions obtained. Also, the products cannot be effectively cross-linked for obvious reasons. Therefore, there is considerable interest in the production and application of intermediate products containing hydantoin groups which can be subsequently converted just before or during application into substantially insoluble polymers.

Accordingly, the present invention relates to oligohydantoins and polyhydantoins which in addition to the hydantoin rings contain one or more olefinically unsaturated groups. These compounds contain radicals of the general formula

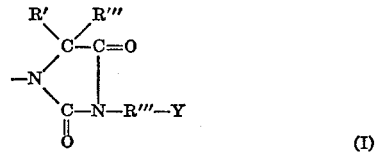

either once or several times in the molecule. The substituents R' and R" which may be the same or different, represent hydrogen, optionally substituted alkyl radicals (preferably $C_1$–$C_8$) or aralkyl radicals (preferably benzoyl radicals). Examples of suitable substituents for the radicals R' and R" include carbalkoxy groups, acyloxy groups, carbhydroxyalkoxy groups or halogen (chlorine, bromine). R''' represents a divalent aliphatic or aromatic radical optionally containing hetero atoms whilst Y represents a vinyl or isopropenyl group. Compounds of this kind are prepared by completely or partially reacting a polyglycine ester with groups of the general formula

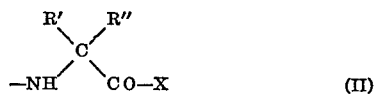

in which R' and R" ae as defined above, whilst X represents an alkoxy, an amino, an alkylamino, an aralkylamino, or a hydroxy group, with an isocyanate of the general formula

or a corresponding masked isocyanate, for example a corresponding aryl urethane of the formula

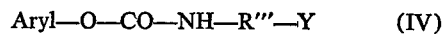

in which R''' and Y are as defined above. It is possible by using both aliphatic and aromatic polyisocyanates to obtain corresponding high molecular weight polyhydantoins which only contain terminal groups of general formula I.

The following are starting materials suitable for the production of the polyhydantoin derivatives according to the invention:

(a) As glycine derivatives, the compounds described in Belgian Patent Specifications 678,282, 700,040, 700,041, 711,591, 711,592 and 711,593, or, respectively, U.S. Pat. 3,397,253 of Mar. 4, 1966, U.S. Pat. 3,448,170 of Feb. 23, 1967, now abandoned U.S. patent application Ser. No.

617,863 of Feb. 23, 1967, now abandoned U.S. patent application Ser. No. 706,695 of Feb. 19, 1968, U.S. patent application Ser. No. 706,621 of Feb. 19, 1968 and U.S. patent application Ser. No. 706,666 of Feb. 19, 1968.

(b) As optionally masked polyisocyanates and polyisothiocyanates, the compounds described in U.S. Pat. 3,397,253, (c) Isocyanates of general formula III include aliphatic and aromatic isocyanates (or their donors) which in addition to the isocyanate groups also contain one or more olefin groups, for example p-isopropenyl phenyl isocyanate, acrylic acid glycol ester isocyanate, and methacrylic acid glycol ester isocyanate.

The glycine derivatives suitable for use as starting materials are identified by the following formulae:

(a) 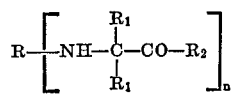

in which R, $R_1$, $R_2$ and $n$ are as defined above (b) 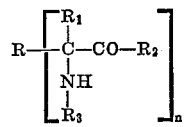

in which R, $R_1$, $R_2$, $R_3$ and $n$ are as defined above (c) 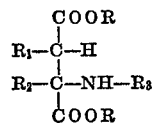

in which R, $R_1$ and $R_2$ represent hydrogen or an alkyl group (which may be substituted), $R_3$ represents an alkyl, aralkyl, or aryl group or heterocyclic radicals (d) 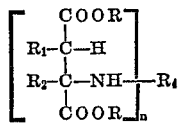

in which R, $R_1$, $R_2$ are as in (c); $R_4$ is as $R_3$ in (c), but $n$-valent; $n=2, 3$ or $4$.

(e) 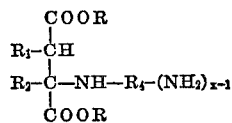

in which R, $R_1$, $R_2$ are as in (c), $R_4$ is as in (d), $x=1, 2, 3$ or $4$.

These compounds may be obtained by methods known *per se* or particularly as follows:

(a) These glycine derivatives can be prepared from the corresponding polyamines and haloacetic acid or derivatives thereof or by Strecker's synthesis via the cyanohydrins and hydrolysis thereof.

(b) These derivatives are obtained from α-halogen polycarboxylic acids or derivatives thereof with ammonia or primary aliphatic or aromatic amines.

(c), (d), (e) These products are obtained from esters of α,β-unsaturated dicarboxylic acids, for example maleic acid or fumaric acid esters by reaction with the corresponding amines.

The reaction involving the polyglycine derivatives, the mono- and polyisocyanates containing olefin groups and the polyisocyanates that may optionally be used in addition is carried out for example in accordance with the procedure described in U.S. Pat. 3,397,253 of Mar. 4, 1966. This process is usually carried out by heating both the components for a prolonged period in an organic solvent, the polymer formed remaining in solution. It may be subsequently isolated by distilling off the solvent or by precipitation. The quantities in which the starting materials are used may be such that from 0.5 to 10 mols of isocyanate or isothiocyanate groups are available per NH group in the glycine derivative, from 1 to 3 mols of isocyanate or isothiocyanate preferably being used. Solvents suitable for use in the process include compounds that are unreactive to NCO groups, for example aromatic hydrocarbons, chlorinated aromatic hydrocarbons, aliphatic hydrocarbons, esters and ketones.

N-alkylpyrrolidones, dimethyl sulphoxide, phenol, cresol and dimethyl formamide are particularly suitable. In cases where iso(thio)cyanate derivatives are used, it is also possibel to employ other solvents, for example alcohols and phenols. It is also possible, however, to react the components without using a solvent.

Synthesis of the oligomeric and polymeric hydantoin components is largely determined by the type of reaction components used. The use of, for example, 2 mols of an isopropenyl phenylisocyanate to 1 mol of an aromatic bis-glycine ester yields a condensate containing two hydantoin groups as illustrated in the following equation:

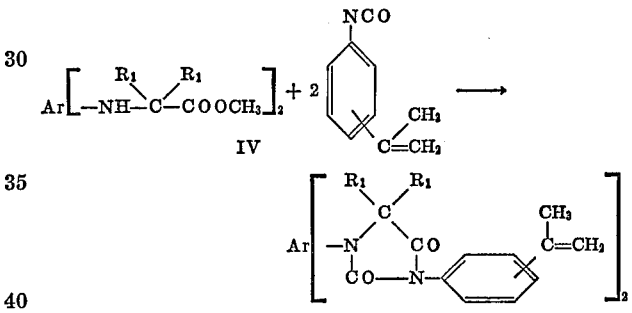

It is possible, by replacing part of the isopropenyl phenyl isocyanate by the usual diisocyanates, to increase both the number of hydantoin rings and the molecular weight of the product obtained. Details of this can be found in the examples.

Another modification comprises reacting a glycine derivative containing olefin groups with an isocyanate containing olefin groups which yields a polyfunctional hydantoin derivative containing olefin groups in accordance with the following equation:

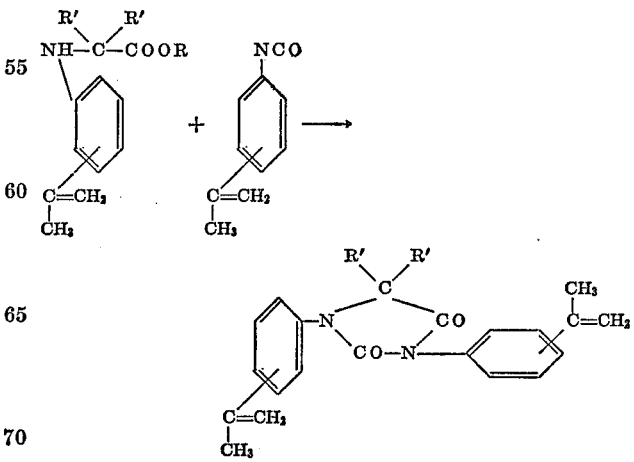

The other method of obtaining comopunds such as these is to react the α-cyanoalkylamines corresponding to the glycine derivatives which, following reaction with the isocyanates, are hydrolysed by way of the "iminohydantoins" into the hydantoins proper, for example in accordance with the following scheme

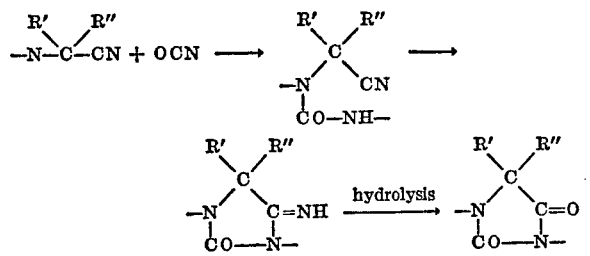

The oligomeric and polymeric hydantoins thus obtained can take part in a further reaction by virtue of the polymerizable olefin groups present in them.

In one particular embodiment, a polyglycine derivative of the formula

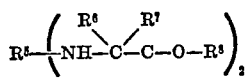

in which $R^5$ represents an alkylene radical with from 1 to 18 carbon atoms or an arylene radical (phenylene, naphthalene or bisphenylene), $R^6$ and $R^7$ represent hydrogen or an alkyl group (preferably $C_1$ to $C_6$), $R_8$ represents an alkyl group with preferably from 1 to 6 carbon atoms, is reacted with an isocyanate of the formula $$OCN—R^9—Y$$

in which $R^9$ represents an aliphatic, aromatic or araliphatic radical (preferably an alkylene group with from 1 to 6 carbon atoms, or an arylene group, for example phenylene or naphthylene), and Y represents a vinyl or isopropenyl group, and simultaneously with a polyisocyanate

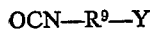

in which $R^{10}$ represents an aliphatic or aromatic radical (preferably an alkylene group with from 1–6 carbon atoms or a phenylene or naphthylene radical) in a molar ratio of 1:0 to 1:50 at temperatures of from 0 to 250° C. As a rule, the quantity of glycine derivative and the total quantity of isocyanate are substantially eequimolar. The procedure adopted is also as in U.S. Pat. 3,397,253 dated Mar. 4, 1966.

Compounds corresponding to the following formula are obtained:

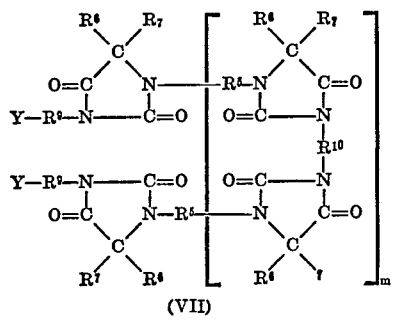

(VII)

In formula (VII), $R^5$, $R^6$, $R^7$, $R^9$, $R^{10}$ and Y are as defined above, whilst $m$ is an integer of between 0 and 100.

In principle any known diisocyanate may be used as the isocyanate

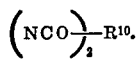

Examples include aliphatic, cycloaliphatic or aromatic compounds with two NCO groups in the molecule such as polymethylene diisocyanate, $OCN—(CH_2)_n—NCO$ ($n=4$ to 8), optionally alkyl-substituted benzene diisocyanates such as $m$- and $p$-phenylene diisocyanates, tolylene-2,4- and 2,6-diisocyanate, ethyl benzene diisocyanates, di- and tri-isopropyl benzene diisocyanates, chloro-p-phenylene diisocyanates, diphenyl methane diisocyanates, naphthylene diisocyanates, ester isocyanate such as triisocyanato arylphosphoric(thio)ester or glycol di-$p$-isocyanatophenyl ester. It is also possible to use partially polymerized isocyanates containing isocyanurate rings and free NCO groups.

The polyisocyanates used may also be employed in the form of their derivatives including for example their reaction product with phenols, alcohols, amines, ammonia, bisulphite and HCl. Examples of such compounds include phenol, cresols, xylenol, ethanol, methanol, propanol, isopropanol, ammonia, methyl amine, ethanolamine, dimethyl amine, aniline and diphenyl amine. It is also possible to use adducts of relatively high molecular weight, for example adducts of polyisocyanates with polyalcohols such as ethylene glycol, propylene glycol, trimethylol alkanes or glycerine.

Accordingly, the radical $R^{10}$ is preferably an aliphatic radical (for example an alkyl group) or an aromatic radical (for example a phenylene group), tolylene, diphenyl methane or diphenyl ether. These radicals may also be substituted.

The oligomers and polymers containing hydantoin and olefin groups obtained in accordance with the invention may generally be used in the production of thermally resistant plastics, for example in the production of lacquers, coatings, films, fibres and also integral plastics.

Further details are given in the following examples.

EXAMPLE 1

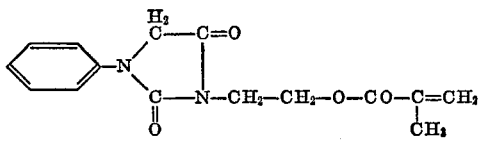

179 parts by weight of N-phenyl gylcine ethyl ester are dissolved in 1000 parts by weight of benzene (pre-distilled), followed by the addition to the resulting solution of 50 parts by weight of phenol and a spatula-tip quantity of hydroquinone. 155 parts by weight of methacrylic acid ($\beta$-isocyanatoethyl) ester are introduced dropwise at room temperature, and the mixture is left standing for some 12 hours. Most of the solvent is then distilled off, the residual oil is taken up in a little ethanol and 1 part by weight of concentrated aqueous sodium hydroxide solution is added. The hydantoin is immediately precipitated.

Yield: 240 parts by weight=83%, M.P. after recrystallization from ethanol 114° C.

EXAMPLE 2

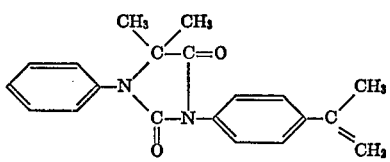

Following the addition of 2 parts by weight of glacial acetic acid, 160 parts by weight of $p$-isopropenyl phenyl isocyanate are added dropwise to a solution of 193 parts by weight of anilino isobutyric acid methyl ester in 1000 parts by weight of benzene. The urea is precipitated after 8 hours at room temperature. Precipitation is completed by the addition of petroleum ether, the urea is dissolved in ethanol and approximately 1 part by weight of concentrated aqueous sodium hydroxide solution is added. The hydantoin is immediately precipitated. Precipitation is completed by the addition of water. Yield 800 parts by weight or 83%, M.P. after recrystallization from ethanol 143–144° C.

EXAMPLE 3

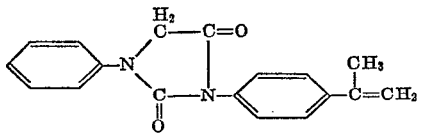

The procedure is as in Example 1 with the following quantities: 180 parts by weight of N-phenyl glycine ethyl ester, 160 parts by weight of p-isopropenyl phenyl isocyanate.

Yield: 210 parts by weight of hydantoin=72%.
M.P. after recrystallization from ethanol=154° C.

EXAMPLE 4

[Formula VII: $R^5=R^{10}=$—⟨⟩—$CH_2$—⟨⟩—, $R^6=R^7=CH_3$, $R^9=$—⟨⟩—, $Y=\overset{CH_3}{\underset{}{C}}=CH_2$, $m=19$]

237.5 parts by weight of 4,4'-diisocyanato diphenyl methane dissolved in 250 parts by weight of toluene are added dropwise to a solution of 398 parts by weight of N,N'-(4,4'-diamino diphenyl methane)-bis-isobutyric acid methyl ester in 1500 parts by weight of cresol to which 0.1 part by weight of Dabco has been added. After 2 hours, 16 parts by weight of p-isopropenyl phenyl isocyanate are stirred into the solution. The mixture is heated to 180° C. and kept at this temperature for between 8 and 10 hours during which time toluene and the methanol formed are distilled off from the solutions. Viscosity of the polyhydantoin as measured on a 15% solution in cresol: $CP_{25° C.}=495$.

EXAMPLE 5

The procedure is as in Example 4 except that the p-isopropenyl phenyl isocyanates are replaced by 15.6 parts by weight of methacrylic acid-(β-isocyanato ethyl)-ester. $CP_{25° C.}$: 490.

What is claimed is:
1. A compound of the formula

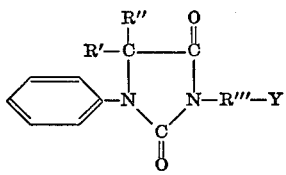

wherein R' and R" are hydrogen or alkyl having 1 to 8 carbon atoms, R''' is paraphenylene or

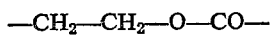

—$CH_2$—$CH_2$—O—CO— and Y is vinyl or isopropenyl.

2. The product of claim 1 having the formula

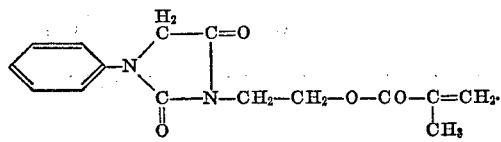

3. The product of claim 1 having the formula

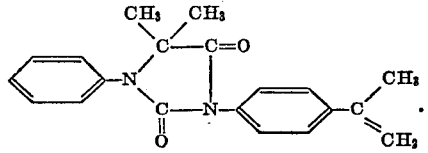

4. The product of claim 1 having the formula

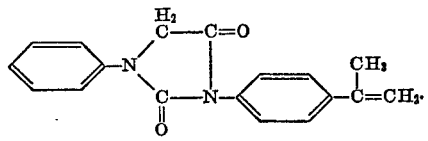

5. A polymer with hydantoin groups corresponding to the formula

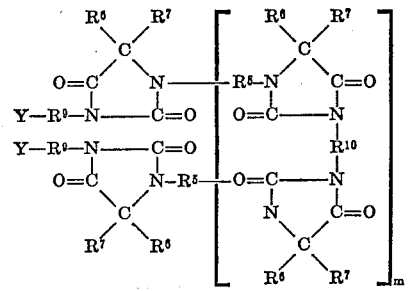

wherein $R^5$ is alkylene having from 1 to 18 carbon atoms, phenylene, naphthylene, bisphenylene or

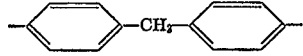

$R^6$ and $R^7$ are hydrogen or alkyl having 1 to 6 carbon atoms, $R^9$ is alkylene having 1 to 6 carbon atoms, phenylene or naphthylene, $R^{10}$ is alkylene having 1 to 6 carbon atoms, phenylene, naphthylene or

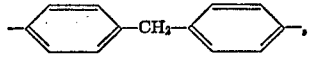

$m$ is an integer of from 0 to 100 and Y is vinyl or isopropenyl.

6. The product of claim 5 wherein $R^5$ and $R^{10}$ are each

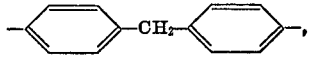

$R^6$ and $R^7$ are each $CH_3$ and $R^9$ is

References Cited

UNITED STATES PATENTS

| | | | |
|---|---|---|---|
| 3,369,010 | 2/1968 | Kelley | 260—86.1 |
| 3,397,253 | 8/1968 | Merten et al. | 260—830 |
| 3,639,418 | 2/1972 | Merten | 260—309.5 |

HENRY R. JILES, Primary Examiner

S. D. WINTERS, Assistant Examiner

U.S. Cl. X.R.

260—77.5 C, 77.5 CH, 77.5 R, 453 Al, 453 AR, 471 A, 471 C, 482 C, 482 R, 486 R